US006610817B2

(12) United States Patent
Plassmann et al.

(10) Patent No.: US 6,610,817 B2
(45) Date of Patent: Aug. 26, 2003

(54) COATING COMPOSITION CONTAINING ALCOHOLIC REACTIVE DILUENTS

(75) Inventors: William H. Plassmann, Waterville, OH (US); Anthony J. Tye, Waterville, OH (US); Patrick J. Mormile, Charlotte, NC (US)

(73) Assignee: BASF Corporation, Southfield, MI (US)

( * ) Notice: Subject to any disclaimer, the term of this patent is extended or adjusted under 35 U.S.C. 154(b) by 97 days.

(21) Appl. No.: 09/740,329

(22) Filed: Dec. 18, 2000

(65) Prior Publication Data

US 2002/0111437 A1 Aug. 15, 2002

(51) Int. Cl.⁷ .................. C08G 59/14; C08G 59/16
(52) U.S. Cl. .............. 528/366; 525/109; 525/110; 525/111; 525/127; 525/438; 525/453; 525/454; 525/523; 525/533
(58) Field of Search .............. 528/366; 525/109, 525/110, 111, 127, 438, 453, 454, 523, 533

(56) References Cited

U.S. PATENT DOCUMENTS

| | | | |
|---|---|---|---|
| 3,001,973 A | 9/1961 | Peipenbrink et al. | 260/75 |
| 3,124,605 A | 3/1964 | Wagner | 260/453 |
| 3,152,162 A | 10/1964 | Fischer et al. | 260/453 |
| 3,201,372 A | 8/1965 | Wagner | 260/77.5 |
| 3,394,164 A | 7/1968 | McClellan et al. | 260/453 |
| 3,404,018 A | 10/1968 | Hicks | 106/252 |
| 3,644,457 A | 2/1972 | König et al. | 260/453 |
| 4,314,918 A | 2/1982 | Birkmeyer et al. | 260/20 |
| 5,126,170 A | 6/1992 | Zwiener et al. | 427/385.5 |
| 5,236,741 A | 8/1993 | Zwiener et al. | 427/385.5 |
| 5,373,069 A | 12/1994 | Rehfuss et al. | 525/456 |
| 5,412,056 A | 5/1995 | Zwiener et al. | 528/73 |
| 5,512,639 A | 4/1996 | Rehfuss et al. | 525/456 |
| 5,646,214 A | 7/1997 | Mayo | 525/10 |
| 5,681,906 A | 10/1997 | Yezrielev et al. | 525/450 |
| 5,973,072 A | 10/1999 | Jones et al. | 525/123 |
| 6,069,203 A | 5/2000 | Henry et al. | 525/31 |
| 6,087,464 A | 7/2000 | Swarup et al. | 528/73 |

FOREIGN PATENT DOCUMENTS

| | | |
|---|---|---|
| EP | 366205 A1 * 5/1990 | |
| WO | WO 96/19468 | 6/1996 |

OTHER PUBLICATIONS

Pilney et al., "Reactive thinners for epoxy resins," Kunststoffe, vol. 67, No. 12 (1977), pp. 783–790.*

* cited by examiner

Primary Examiner—Robert E. L. Sellers
(74) Attorney, Agent, or Firm—Anne Gerry Sabourin

(57) ABSTRACT

Reactive diluents are formed by reaction of a compound having at least two glycidyl ester groups and a compound having at least one hydroxyl and/or carboxyl group. The diluents are useful in coating compositions together with crosslinking agents and optional other vehicle components.

10 Claims, No Drawings

US 6,610,817 B2

COATING COMPOSITION CONTAINING ALCOHOLIC REACTIVE DILUENTS

FIELD OF THE INVENTION

The present invention is directed to organic reactive diluents and their use in crosslinkable coating compositions. More specifically, the invention discloses methods of preparing organic reactive diluents and crosslinkable coating compositions.

BACKGROUND OF THE INVENTION

Most coating compositions contain one or more film-forming resins and polymers and organic solvents. Even waterborne (or water-based) coating compositions usually include a portion of an organic solvent or cosolvent. The organic solvent serves a number of functions. First, particularly for solventborne (or solvent-based) compositions, the organic solvent reduces the viscosity of the coating composition to facilitate its application to a substrate. The solvent is volatile and evaporates from the coating during and after application. In addition, a portion of the solvent is generally slower to evaporate so that it remains in the applied coating to enhance film formation and flow of the coating. In waterborne coatings, for which water is the principal viscosity reducer, organic cosolvents may also be used to help stabilize the dispersed film-forming materials.

The presence of the volatile organic solvents is of concern, however, because they form the bulk of the regulated emissions produced during application and curing of the coating composition. While waterborne coating compositions offer lower emissions, waterborne coating also require more elaborate application methods and tend to produce coatings that are more water-sensitive. Another avenue for reducing regulated emissions has been to include so-called reactive diluents, low molecular weight functional compounds that reduce the viscosity of the coating composition and aid in leveling and film formation like solvents, but are reactive with the film forming resin and/or crosslinking agent so as to become a part of the film when the coating composition cures.

Birkmeyer et al., U.S. Pat. No. 4,314,918 describes coating compositions having a vehicle portion that essentially consists of: (a) from 35 to 55 wt % of a cross-linking agent; (b) from 15% to 50% of a curable polyol resin; and (c) from 15% to 50% of a reactive diluent. The reactive diluent is synthesized by reacting from 0.25 to 4 moles of a glycidyl ester with one mole of a functional material having a molecular weight of less than 1000, a hydroxy equivalent weight of from 30 to 1000, a carboxyl equivalent weight of from 50 to 1000, and a total hydroxyl and carboxyl functionality of at least 2.0. The Birkmeyer patent does not disclose methods for producing reactive diluents from polyepoxide compounds.

Henry et al., U.S. Pat. No. 6,069,203, discloses a hydroxy-functional oligoether similar to the reactive diluent of the Birkmeyer patent. The oligoether of the Henry patent is prepared by reacting a polyol free of carboxyl groups and having three or four hydroxyl groups with a mono-glycidyl ester of a branched carboxylic acid, containing from 5 to 13 carbon atoms.

Swarup et al., U.S. Pat. No. 6,087,464, Jones et al., U.S. Pat. No. 5,973,072, and Yezrielev et al., U.S. Pat. No. 5,681,906 disclose coating compositions including a phenolic ester alcohol made by reacting hydroxybenzoic acid and an epoxide-functional compound, or a phenolic ester urethane compound prepared by reacting the phenolic ester alcohol with a diisocyanate compound. These patents do not disclose aliphatic reactive diluents or methods for producing aliphatic reactive diluents. Aromatic materials such as those of the Swarup, Jones, and Yezrielev patents, however, are unsuitable for exterior automotive topcoat coatings because they tend to yellow from outdoor exposure.

It would, therefore, be desirable to prepare reactive diluent materials that could be included in automotive topcoat coatings in substantial amounts. It would also be desirable to prepare such reactive diluents by using aliphatic polyepoxide compounds.

SUMMARY OF THE INVENTION

A method of forming a reactive diluent comprises a step of reacting together
  (a) a compound with a molecular weight of up to about 1000 having at least two glycidyl groups and
  (b) a compound with a molecular weight of up to about 1000, having one hydroxyl or carboxyl group, or having one carboxyl group and one or more hydroxyl groups.

From about 0.95 to about 1.05 moles of compound (b) is reacted for each equivalent of glycidyl groups of the compound (a).

By molecular weight, we mean the actual molecular weight of a compound, or, if the compound is a polydisperse oligomeric or polymeric material, we mean the weight average molecular weight of the material.

The reactive diluent is included in a coating composition in an amount from about 5% to about 50% by weight, based on the total nonvolatile weight of the vehicle. The vehicle is understood as the resinous or polymeric material of the coating composition.

DETAILED DESCRIPTION OF THE INVENTION

The reactive diluent is prepared by reacting together a polyglycidyl compound having a molecular weight of up to about 1000 and a hydroxyl- and/or carboxyl-functional compound with a molecular weight of up to about 1000.

The polyglycidyl compound is preferably aliphatic, more preferably cycloaliphatic. The polyglycidyl compound preferably has from 2 to about 4 glycidyl groups, and more preferably 2 glycidyl groups. The polyglycidyl compounds are glycidyl esters, particularly diglycidyl esters. In particular, the polyglycidyl compound may be selected from hexahydrophthalic acid diglycidyl ester, succinic acid diglycidyl ester, and combinations of these.

The polyglycidyl compound preferably has a molecular weight of from about 200 to about 500, more preferably from about 300 to about 400.

The polyglycidyl compound is reacted with a compound that has an hydroxyl and/or carboxylic acid group. The hydroxyl and/or carboxylic acid group is preferably bound to an aliphatic carbon atom. Particularly preferably, the compound that has the hydroxyl and/or carboxylic acid group is aliphatic. When the compound has a carboxylic acid group, the compound may have from one to about 4 hydroxyl groups. It is possible in that case to avoid polymerization because the acid group reacts at a faster rate than the hydroxyl group or groups. Particular examples of suitable compounds that are reacted with the polyglycidyl compound include, without limitation, monoalcohols such as octanol, and cyclohexanol; monocarboxylic acids such as octanoic acid, nonanoic acid, stearic acid, and cyclohexanoic acid; and hydroxycarboxylic acids such as dimethylolpropionic acid; as well as combinations of these compounds.

The hydroxyl- and/or carboxyl-functional compound has a molecular weight of up to about 1000, preferably from about 60 to about 500, and more preferably from 100 to about 300.

The reaction is carried out with a ratio of from about 0.95 to about 1.05 moles the hydroxyl- and/or carboxyl-functional compound for each equivalent of glycidyl groups of the polyglycidyl compound. Thus, on average, only about one carboxyl or hydroxyl group of each compound reacts with a glycidyl group. A catalyst for the reaction may be employed, for example tertiary amines such as triethylamine. Reaction conditions typical for such reactions and esterification reactions may be used. The reaction may be carried out in an organic solvent medium, but preferably the reaction is carried out neat, i.e., in a reactor containing only the reactants and any catalyst used. When a solvent is used, it is generally used in an amount of from about 1 to about 15 percent by weight of the reactive diluent solution product. Typical solvents include, without limitation, esters such as ethyl acetate, butyl acetate, and propyl propionate; ketones, such a methyl ethyl ketone, methyl propyl ketone, methyl isobutyl ketone, and ethyl butyl ether; glycol ether esters, such as ethylene glycol monopropyl ether acetate and propylene glycol monomethyl ether acetate; non-oxygenated solvents, such as toluene and xylene; and combinations of these.

The reactive diluent formed preferably has a molecular weight of from about 200 to about 1000, more preferably from about 300 to about 900, and even more preferably from about 400 to about 800.

The reactive diluent formed has secondary hydroxyl groups as a result of the ring-opening of the glycidyl group. The reactive diluent may have other hydroxyl groups and/or carboxylic acid groups as well if a polyfunctional compound is used as the hydroxyl- and/or carboxyl-functional compound because the reaction ratio provides for reaction of only one functional group of the hydroxyl- and/or carboxyl-functional compound, on average.

The coating composition preferably includes from about 5% to about 70% by weight of the reactive diluent, more preferably from about 10% to about 60% by weight of the reactive diluent, and even more preferably from about 15% to about 50% by weight of the reactive diluent, based on the total nonvolatile weight of the vehicle portion of the coating composition. A preferred range of reactive diluent for those compositions containing no further vehicle components reactive with the crosslinker is about 30% to about 70% while for those compositions containing an additional vehicle component reactive with the crosslinker it is about 15% to about 50%.

The coating composition preferably further includes a crosslinker material reactive with the reactive diluent and, optionally, with other material in the coating composition to form a curable coating composition. The crosslinker includes at least two, and preferably more than two, groups that are reactive with the hydroxyl groups of the reactive diluent. The coating composition preferably includes from about 10% to about 80% by weight crosslinker, more preferably from about 15% to about 70% by weight crosslinker, and even more preferably from about 20% to about 55% by weight crosslinker, based on the total nonvolatile weight of the vehicle portion of the coating composition. Illustrative examples of crosslinkers include, without limitation, aminoplast resins or phenol/formaldehyde adducts, as well as other materials having active methylol or methylalkoxy groups, unblocked polyisocyanates, blocked polyisocyanates, compounds having silane groups, polyepoxide materials, and compounds having anhydride groups; and mixtures thereof. Among preferred curing agent compounds are melamine formaldehyde resin (including monomeric or polymeric melamine resin and partially or fully alkylated melamine resin), blocked or unblocked polyisocyanates, urea resins (e.g., methylol ureas such as urea formaldehyde resin, alkoxy ureas such as butylated urea formaldehyde resin), polyanhydrides (e.g., polysuccinic anhydride), and combinations of these. In the case of crosslinkers such as the unblocked polyisocyanates that do not have long-term stability at room temperatures when mixed with the reactive diluent (and any other reactive component of the coating composition), the coating is formulated as a two-component coating composition, also known as two-pack or 2K coating composition, with the crosslinker being segregated in a container separate from the components with which it is reacts.

Examples of suitable polyisocyanates include, without limitation, alkylene polyisocyanates such as hexamethylene diisocyanate, 2,2,4- and/or 2,4,4-trimethylhexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanatodicyclohexylmethane, 3-isocyanato-methyl-3,5,5-trimethyl cyclohexyl isocyanate, aromatic polyisocyanates such as 2,4'- and/or 4,4'-diisocyanatodiphenylmethane, 2,4- and/or 2,6-diisocyanatotoluene, naphthylene diisocyanate, and mixtures of these polyisocyanates. It is preferred to use the known derivatives or adducts of those monomeric polyisocyanates. Examples include biuret-group-containing polyisocyanates, such as those described, for example, in U.S. Pat. No. 3,124,605 and U.S. Pat. No. 3,201,372 or DE-OS 1,101,394; isocyanurate-group-containing polyisocyanates, such as those described, for example, in U.S. Pat. No. 3,001,973, DE-PS 1,022,789, 1,222,067 and 1,027,394 and in DE-OS 1,929,034 and 2,004,048; urethane-group-containing polyisocyanates, such as those described, for example, in DE-OS 953,012, BE-PS 752,261 or U.S. Pat. No. 3,394,164 and U.S. Pat. No. 3,644,457; carbodiimide group-containing polyisocyanates, such as those described in DE-PS 1,092,007, U.S. Pat. No. 3,152, 162 and DE-OS 2,504,400, 2,537,685 and 2,552,350; allophanate group-containing polyisocyanates, such as those described, for example, in GB-PS 994,890, BE-PS 761,626 and NL-OS 7,102,524; and uretdione group-containing polyisocyanates, such as those described in EP-A 0,377,177, each reference being incorporated herein by reference. Examples of blocking agents include, without limitation, phenols, thiols, oximes, caprolactams, and secondary aromatic amines.

Aminoplast resins include melamine/formaldehyde resins that are partially or fully alkylated with lower alcohols, such as methylated, butylated, isobutylated, and mixed alkylated monomeric and polymeric melamine resins. Phenoplast resins suitable as crosslinkers include the condensation product of an aldehyde with a phenol. Formaldehyde is a preferred aldehyde. Various phenols can be used, e.g., phenol per se, cresol, para-phenylphenol, para-tertiaryphenol, para-tertiaryamylphenol and cyclopentylphenol.

The coating composition may further include, as part of the vehicle, one or more curable resins (by which term we specifically include compounds as well as oligomeric and polymeric materials) reactive with the crosslinker. The coating composition preferably includes up to about 75% by weight of curable resin, more preferably from about 15% to about 70% by weight of curable resin, and even more preferably from about 20% to about 60% by weight of curable resin, based on the total nonvolatile weight of the vehicle portion of the coating composition.

While many suitable materials may be selected as the curable resin, particular mention is made of polyesters, polyurethanes, polyurea polymers, and acrylic polymers. Other reactive diluents, including aspartic acid derviative compounds as described in Zwiener et al., U.S. Pat. Nos. 5,126,170, 5,236,741, 5,412,056, and 5,623,045, each of which is incorporated herein by reference, and aldiminefunctional reactive diluents.

Polyesters are formed by reaction of polyols with polycarboxylic acids or acid anhydrides. Suitable examples of polyols for making the polyesters include alkylene glycols, such as ethylene glycol, propylene glycol, butylene glycol and neopentyl glycol, and other glycols such as hydrogenated bisphenol A, cyclohexanedimethanol, caprolactonediol reaction products, hydroxyalkylated bisphenols, polyether glycols, e.g., poly (oxytetramethylene) glycol, and similar type compounds. Other diols of various types and polyols of higher functionality can also be used. Such higher polyols include trimethylolpropane, trimethylolethane, pentaerythritol and higher molecular weight polyols, such as obtained by the reaction product of ethylene oxide and trimethylolpropane and various hydrolyzed epoxide resins. Suitable carboxylic acids used in the reaction with the above-described polyols include phthalic, isophthalic, terephthalic, tetrahydrophthalic, hexahydrophthalic, adipic, azelaic, sebacic, maleic, glutaric, chlorendic, tetrachlorophthalic, maleic, fumaric, itaconic, malonic, suberic, 2-methylsuccinic, 3,3-diethylglutaric, 2,2-dimethylsuccininc acid and trimellitic acid. Anhydrides of these acids where they exist can also be employed and are encompassed by the term "carboxylic acid." Monocarboxylic acids such as benzoic acid and hexanoic acid can also be used, provided the average functionality of the polyol is above about 2.0. Saturated acids (including those aromatic acids where the only unsaturation is in the aromatic ring) are preferred.

There are also polyol-containing acrylics which are useful as the film-forming component. An important class of thermosetting acrylic resins that are used comprises the crosslinking carboxyl-containing polymers. The thermosetting carboxyl polymers that are used herein consist generally of acrylic resins or modified acrylic resins containing from about 3 to about 40 percent by weight of ethylenically unsaturated acid.

Acrylic polymers may be polymerized from one or more monomers having groups reactive with the crosslinker or groups that can later be derivatized to provide groups reactive with the crosslinker, preferably along with one or more comonomers. Examples of such monomers and comonomers include, without limitation, α,β-ethylenically unsaturated monocarboxylic acids containing 3 to 5 carbon atoms such as acrylic, methacrylic, and crotonic acids and the esters of those acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; hydroxyethyl acrylate, hydroxyethyl methacrylate, hydroxypropyl acrylate, hydroxypropyl methacrylate, hydroxybutyl acrylate, and hydroxybutyl methacrylate; and polyalkylene glycol acrylates and methacrylates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The comonomers may be used in any combination. Carbamate-functional acrylic polymers may be prepared as described, for example, by McGee et al. in U.S. Pat. No. 5,639,554, incorporated herein by reference.

The coating compositions may further include one or more pigments and one or more conventional additives, such as fillers, catalysts, surfactants, hindered amine light stabilizers, UV absorbers, antioxidants, dispersing agents, rheology control agents, adhesion promoters, and so on are included in the compositions for their known functions. The pigment may be any organic or inorganic compounds or colored material, metallic or other inorganic flake materials such as mica or aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1).

Organic solvents and conventional additives can be included in the coating compositions. The preferred compositions contain less than about 60% by weight, more preferably less than 50% by weight, based on the total coating composition weight, of a volatile organic solvent that are included for regulatory purposes in the category of VOCs.

Coating compositions can be coated on the article by any of a number of techniques well-known in the art. These include, for example, spray coating, dip coating, roll coating, curtain coating, and the like. For automotive body panels, spray coating is preferred. In one embodiment, the reactive diluent is included in one component of a multi-component refinish automotive coating composition. The multi-component refinish coating composition has at least one second component, which includes a crosslinker reactive with the reactive diluent under conditions appropriate of refinish coatings.

The invention is further described in the following example. The example is merely illustrative and does not in any way limit the scope of the invention as described and claimed. All parts are parts by weight unless otherwise noted.

EXAMPLE 1

A reaction vessel was set up with heating means, stirring means and a nitrogen sparge. The vessel was initially charged with 255 grams of hexahydrophthalic acid diglycidyl ester, 227 grams of octanoic acid, 1.2 grams methyl amyl ketone. The mole ratio of diglycidyl ester to octanoic acid was 1:2. The mixture was heated to 150° C. and held at the reaction temperature until a constant acid value was achieved (about 8 hours). The product had an acid number of 9.6, a non-volatile content of 96.4%, a Gardner-Holt viscosity of X+1/4, and a hydroxyl value of 300.

EXAMPLE 2

A coating composition was formulated by mixing together

|  | wt. % |
|---|---|
| Reactive diluent of Example I | 38.4 |
| Methyl amyl ketone | 15.1 |
| Butyl acetate | 1.7 |
| Aromatic 100 | 3.3 |
| 3% dibutyl tin dilaurate solution | 2.9 |
| BYK 331 | 0.04 |
| hexamethylene diisocyanate trimer | 38.6 |

The composition had a 73% solids content by weight and a #4 Ford cup viscosity of 17.9 seconds at 24° C.

The composition was spray applied to a metal panel substrate and then baked at 130° C. for 17 minutes to give a 2 mil dry film thickness. The resultant coating had a good appearance and was durable, based on its solvent resistance and water resistance.

The invention has been described in detail with reference to preferred embodiments thereof. It should be understood, however, that variations and modifications can be made within the spirit and scope of the invention and of the following claims.

What is claimed is:

1. A method of forming a reactive diluent comprising reacting together
   (a) a cycloaliphatic compound with a molecular weight of up to about 1000 having at least two glycidyl ester groups and
   (b) an aliphatic compound with a molecular weight of up to about 1000, having one carboxylic acid group, one hydroxyl group, or one carboxylic acid group and one or more hydroxyl groups;
wherein from about 0.95 to about 1.05 moles of compound (b) is reacted for each equivalent of glycidyl groups of the compound (a).

2. A method according to claim 1, wherein the compound (a) has a molecular weight from about 200 to about 500.

3. A method according to claim 1, wherein the compound (a) is a diglycidyl ester.

4. A method according to claim 1 wherein the compound (a) comprises hexahydrophthalic acid diglycidyl ester.

5. A method according to claim 1, wherein the compound (b) has one hydroxyl group.

6. A method according to claim 5, wherein the hydroxyl group of compound (b) is bound to an aliphatic carbon atom.

7. A method according to claim 1, wherein the compound (b) has one carboxyl group.

8. A method according to claim 7, wherein the carboxyl group of compound (b) is bound to an aliphatic carbon atom.

9. A method according to claim 1, wherein the compound (b) comprises octanoic acid.

10. A method of forming a reactive diluent comprising reacting together
    (a) an aliphatic compound with a molecular weight of up to about 1000 having at least two glycidyl ester groups and
    (b) an aliphatic compound with a molecular weight of up to about 1000, having one carboxylic acid group, one hydroxyl group, or one carboxylic acid group and one or more hydroxyl groups comprising octanoic acid;
wherein from about 0.95 to about 1.05 moles of compound (b) is reacted for each equivalent of glycidyl groups of the compound (a).

* * * * *